(12) United States Patent
Franchuk

(10) Patent No.: US 6,695,565 B1
(45) Date of Patent: Feb. 24, 2004

(54) MOTORCYCLE LOADING AND SUPPORT ASSEMBLY FOR A TRUCK

(76) Inventor: Ken R. Franchuk, 1713 - 40th Ave., Amery, WI (US) 54001

( * ) Notice: Subject to any disclaimer, the term of this patent is extended or adjusted under 35 U.S.C. 154(b) by 0 days.

(21) Appl. No.: 10/303,175

(22) Filed: Nov. 25, 2002

(51) Int. Cl.7 .................................................. B60P 3/07
(52) U.S. Cl. ...................................... 414/537; 414/462
(58) Field of Search ................................ 414/537, 538, 414/430, 462, 522, 480

(56) References Cited

U.S. PATENT DOCUMENTS

| 4,311,261 A | 1/1982 | Anderson et al. | |
|---|---|---|---|
| D264,199 S | 5/1982 | Wood | |
| 4,932,829 A | 6/1990 | Miller | |
| 5,730,577 A | 3/1998 | Jones | |
| 5,846,047 A | 12/1998 | Riekki | |
| 5,934,863 A | 8/1999 | Beck | |
| 6,176,672 B1 | 1/2001 | Egan et al. | |
| 6,250,874 B1 | * 6/2001 | Cross | 414/537 |
| 6,431,815 B1 | * 8/2002 | Zarzecki et al. | 414/537 |
| 6,524,056 B1 | * 2/2003 | Kloster | 414/462 |
| 6,634,849 B2 | * 10/2003 | Clary | 414/538 |

* cited by examiner

*Primary Examiner*—James R. Bidwell

(57) ABSTRACT

A motorcycle loading and support assembly for a truck for a single user to load and unload a motorcycle from a truck box. The motorcycle loading and support assembly for a truck includes a ramp assembly including a plurality of channel members being detachably attached end-to-end for loading and supporting a motorcycle upon a truck box; and also includes a ramp support member being adapted to be attached to a hitch receiver of a truck for supporting the channel members; and further includes a winch assembly being adapted to be securely mounted to the truck for pulling the motorcycle upon the truck box; and also includes tie-downs for securing a motorcycle upon the truck box; and further includes an assembly of fueling a motorcycle.

10 Claims, 3 Drawing Sheets

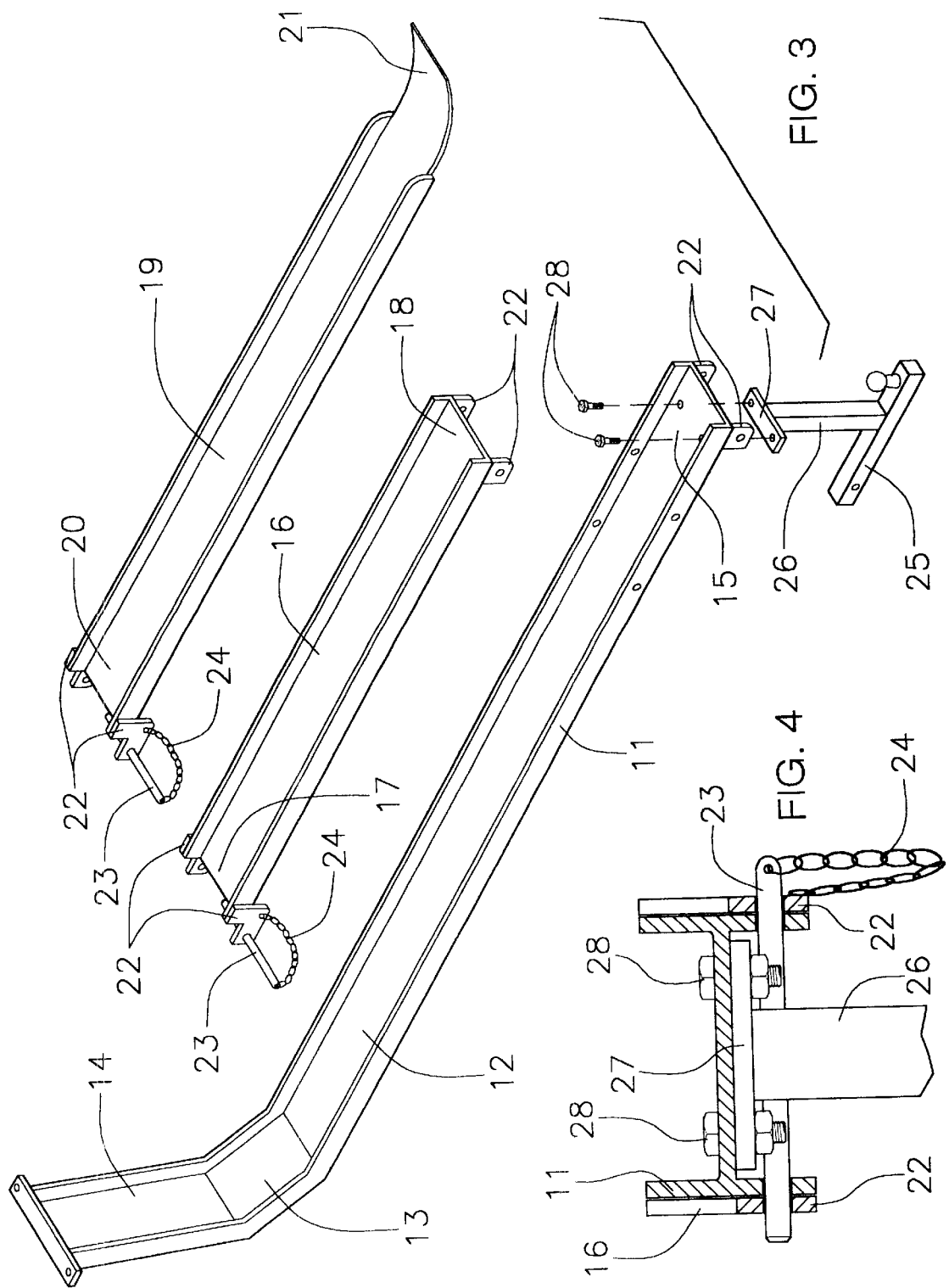

US 6,695,565 B1

MOTORCYCLE LOADING AND SUPPORT ASSEMBLY FOR A TRUCK

BACKGROUND OF THE INVENTION

1. Field of the Invention

The present invention relates to motorcycle loaders and supports for trucks and more particularly pertains to a new motorcycle loading and support assembly for a truck for a single user to load and unload a motorcycle from a truck box.

2. Description of the Prior Art

The use of motorcycle loaders and supports for trucks is known in the prior art. More specifically, motorcycle loaders and supports for trucks heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 4,932,829; U.S. Pat. No. 5,934,863; U.S. Pat. No. 5,730,577; U.S. Pat. No. 6,176,672; U.S. Pat. No. 5,846,047; U.S. Pat. No. 4,311,261; and U.S. Pat. No. Des. 264,199.

While these devices fulfill their respective, particular objectives and requirements, the aforementioned patents do not disclose a new motorcycle loading and support assembly for a truck. The prior art includes inventions includes ramps being extended from the truck boxes and also includes tie-down assemblies for securing the motorcycles upon the truck boxes.

SUMMARY OF THE INVENTION

The general purpose of the present invention, which will be described subsequently in greater detail, is to provide a new motorcycle loading and support assembly for a truck which has many of the advantages of the motorcycle loaders and supports for trucks mentioned heretofore and many novel features that result in a new motorcycle loading and support assembly for a truck which is not anticipated, rendered obvious, suggested, or even implied by any of the prior art motorcycle loaders and supports for trucks, either alone or in any combination thereof. The present invention includes a ramp assembly including a plurality of channel members being detachably attached end-to-end for loading and supporting a motorcycle upon a truck box; and also includes a ramp support member being adapted to be attached to a hitch receiver of a truck for supporting the channel members; and further includes a winch assembly being adapted to be securely mounted to the truck for pulling the motorcycle upon the truck box; and also includes tie-downs for securing a motorcycle upon the truck box; and further includes an assembly of fueling a motorcycle. None of the prior art includes the combination of elements of the present invention.

There has thus been outlined, rather broadly, the more important features of the motorcycle loading and support assembly for a truck in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

It is an object of the present invention to provide a new motorcycle loading and support assembly for a truck which has many of the advantages of the motorcycle loaders and supports for trucks mentioned heretofore and many novel features that result in a new motorcycle loading and support assembly for a truck which is not anticipated, rendered obvious, suggested, or even implied by any of the prior art motorcycle loaders and supports for trucks, either alone or in any combination thereof.

Still another object of the present invention is to provide a new motorcycle loading and support assembly for a truck for a single user to load and unload a motorcycle from a truck box.

Still yet another object of the present invention is to provide new motorcycle loading and support assembly for a truck that is easy and convenient to set up and use.

Even still another object of the present invention is to provide a new motorcycle loading and support assembly for a truck that eliminates the user from having to lift the motorcycle upon the truck box which could result in the user injuring oneself.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is an exploded perspective view of the ramp assembly of the present invention.

FIG. 4 is a cross-sectional view of one of the channel members of the present invention.

DESCRIPTION OF THE PREFERRED EMBODIMENT

Figure 1:
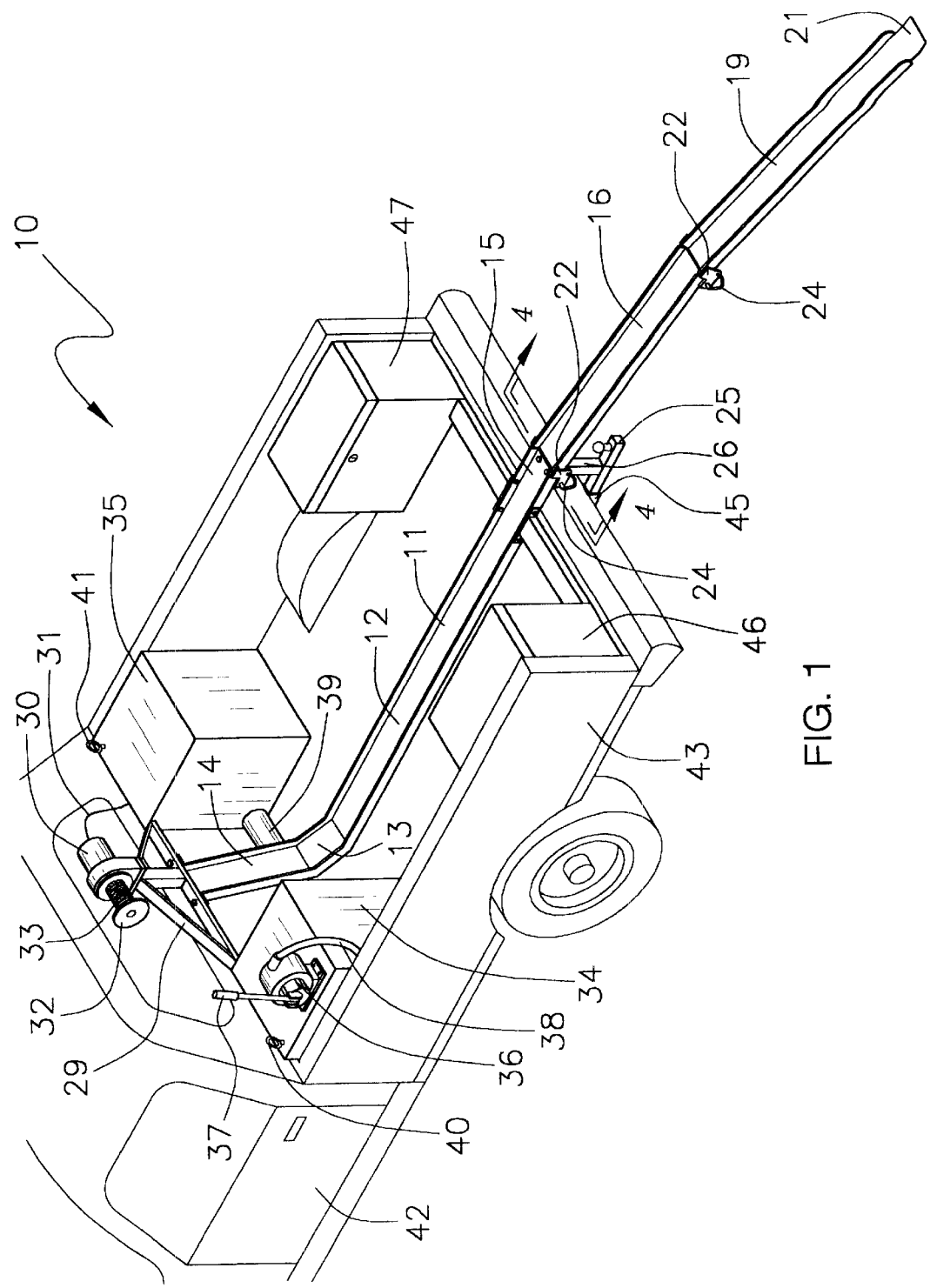
FIG. 1 is a perspective view of a new motorcycle loading and support assembly for a truck according to the present invention.
Figure 2:
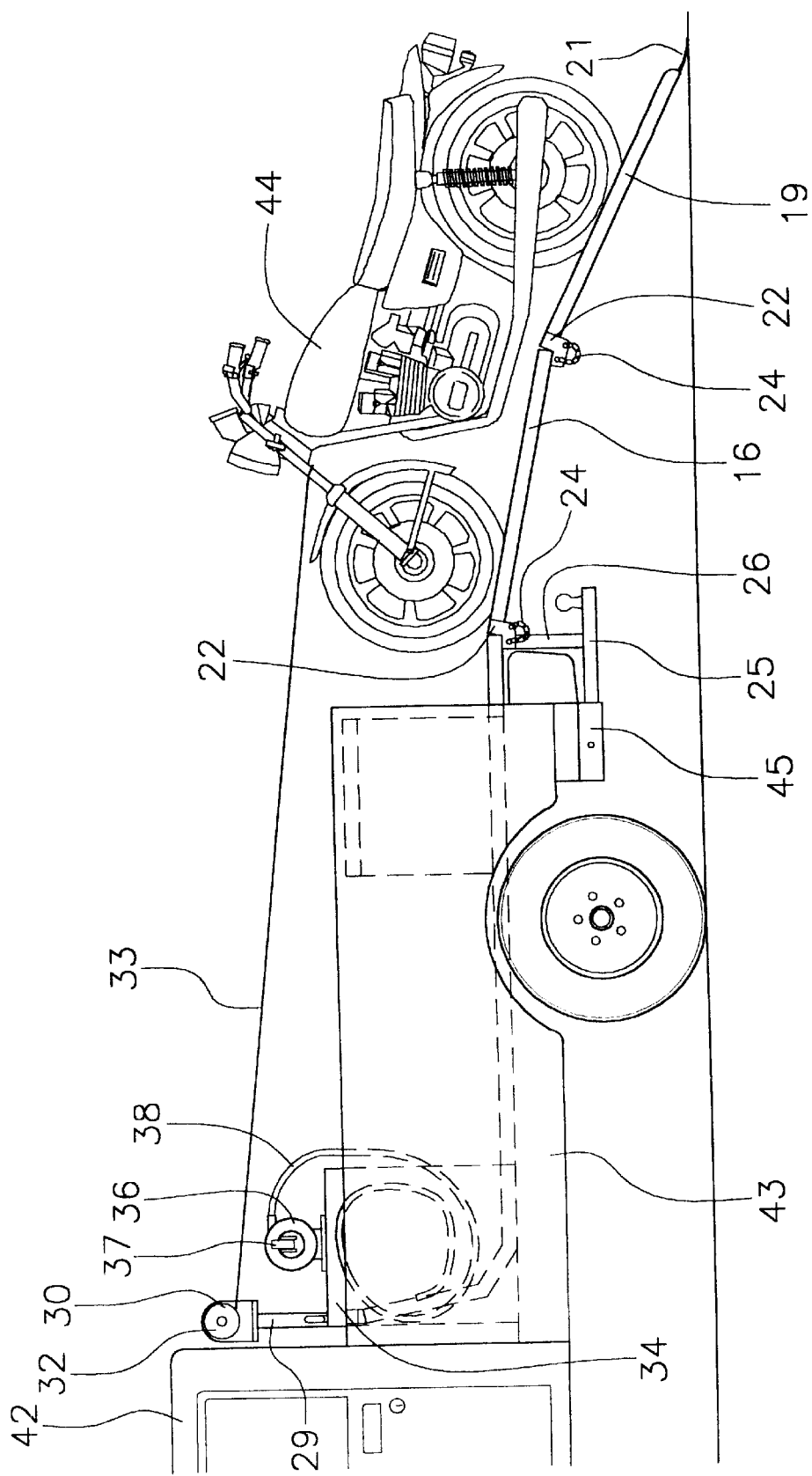
FIG. 2 is a side elevational view of the present invention.

With reference now to the drawings, and in particular to FIGS. 1 through 4 thereof, a new motorcycle loading and support assembly for a truck embodying the principles and concepts of the present invention and generally designated by the reference numeral 10 will be described.

As best illustrated in FIGS. 1 through 4, the motorcycle loading and support assembly for a truck 10 generally comprises a ramp assembly including a plurality of channel members 11,16,19 being detachably attached end-to-end for loading and supporting a motorcycle 44 upon a truck box 43. The channel members 11,16,19 include a main channel member 11 which is adapted to be supported upon the truck box 43, and also includes an intermediate channel member 16 which has a front end 17 which is fastenable to a back end 15 of the main channel member 11 and which adapted to extend from the truck box 43, and further includes an end channel member 19 having a front end 20 which is fastenable to a back end 18 of the intermediate channel member 16. The main channel member 11 includes an elongate main portion 12, and also includes an intermediate portion 13 being integrally attached to a front end of the elongate main portion 12 and being angled upwardly relative to the elongate main portion 12, and further includes an end portion 14 which is integrally attached to and angled upwardly relative to the intermediate portion 13. The end channel member 19 includes an upwardly curved back end portion 21 being adapted to rest upon a ground. The ramp assembly also includes a plurality of bracket members 22 being conventionally attached to the back ends 15,18 of the main channel member 11 and the intermediate channel member 16, and being attached to the front ends 17, 20 of the intermediate channel member 16 and the end channel member 19. The ramp assembly further includes a plurality of pins 23 being removably disposed through holes in the bracket members 22 for fastening the channel members 11,16,19 together, and also includes a plurality of support chains 24 being conventionally attached to the pins 23 and to the bracket members 22.

A ramp support member is adapted to be attached to a hitch receiver 45 of a truck 42 for supporting the channel members 11,16,19. The ramp support member includes an elongate hitch member 25 which adapted to be fastenably received in the hitch receiver 45, and also includes a post member 26 being conventionally attached to the elongate hitch member 25 and extending upwardly therefrom, and further includes a planar mounting bracket 27 being conventionally attached to a top end of the post member 26 and having holes disposed therethrough and being fastenable with fasteners 28 near the back end 15 of the main channel member 11.

A winch assembly is adapted to be securely and conventionally mounted to the truck 42 for pulling the motorcycle 44 upon the truck box 43. The winch assembly includes a mounting bracket 29 being adapted to be securely attached to the truck box 43, and also includes a motor 30 being securely and conventionally mounted upon the mounting bracket 29 and having a power cord 31 which is adapted to be connected to a power source of the truck 42, and further includes a reel 32 being rotatably and conventionally mounted to the motor 30, and also includes a cable 33 being carried about the reel 32 and being adapted to hook to the motorcycle 44 for pulling the motorcycle 44 upon the ramp assembly. Tie-downs 40,41 are used to secure the motorcycle 44 upon the truck box 43.

An assembly of fueling the motorcycle 44 includes a pump support stand 34 being adapted to be securely disposed upon the truck box 43, and also includes fuel tank members 35 being adapted to be securely disposed upon the truck box 43, and further includes a pump 36 being conventionally mounted upon the pump support stand 34 and including a lever 37 for pumping fuel from the fuel tank members 35 and also including a hose 38 for dispensing fuel to the motorcycle 44, and also includes a conduit 39 conventionally interconnecting the fuel tank members 35 to the pump 36 and upon which the end portion 14 of the main channel member 11 is disposed. The tie-downs 40,41 are generally eyelets being conventionally attached to the fuel tank members 35 and to the pump support stand 34. Storage units 46,47 are adapted to be conventionally mounted upon the truck box.

In use, the user fastens the channel members 11,16,19 end-to-end and secures the main channel member 11 upon the ramp support member, and also lets out the cable 33 from the reel 32 and connects the cable 33 to the motorcycle 44. The user then energizes the motor 30 which rotates the reel 32 to take up the cable 33 thus pulling the motorcycle upon the channel members 11,16,19 and upon the truck box 43; whereupon, the user secures the motorcycle 44 to the tie-downs 40,41, and then removes the intermediate channel member 16 from the main channel member 11 and removes the end channel member 19 from the intermediate channel member 16.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the motorcycle loading and support assembly for a truck. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A motorcycle loading and support assembly for a truck comprising:

a ramp assembly including a plurality of channel members being detachably attached end-to-end for loading and supporting a motorcycle upon a truck box;

a ramp support member being adapted to be attached to a hitch receiver of a truck for supporting said channel members;

a winch assembly being adapted to be securely mounted to the truck for pulling the motorcycle upon the truck box;

tie-downs for securing a motorcycle upon the truck box;

a means of fueling a motorcycle;

and storage units being adapted to be mounted upon the truck box.

2. A motorcycle loading and support assembly for a truck as described in claim 1, wherein said channel members include a main channel member which is adapted to be supported upon the truck box, and also include an intermediate channel member which has a front end which is fastenable to a back end of said main channel member and which adapted to extend from the truck box, and further include an end channel member having a front end which is fastenable to a back end of said intermediate channel member.

3. A motorcycle loading and support assembly for a truck as described in claim 2, wherein said main channel member includes an elongate main portion, and also includes an intermediate portion being integrally attached to a front end of said elongate main portion and being angled upwardly relative to said elongate main portion, and further includes an end portion which is integrally attached to and angled upwardly relative to said intermediate portion.

4. A motorcycle loading and support assembly for a truck as described in claim 3, wherein said end channel member includes an upwardly curved front end portion being adapted to rest upon a ground.

5. A motorcycle loading and support assembly for a truck as described in claim 4, wherein said ramp assembly also includes a plurality of bracket members being attached to said back ends of said main channel member and said intermediate channel member, and being attached to said front ends of said intermediate channel member and said end channel member.

6. A motorcycle loading and support assembly for a truck as described in claim 5, wherein said ramp assembly further includes a plurality of pins being removably disposed through holes in said bracket members for fastening said channel members together, and also includes a plurality of support chains being attached to said pins and to said bracket members.

7. A motorcycle loading and support assembly for a truck as described in claim 6, wherein said ramp support member includes an elongate hitch member which adapted to be fastenably received in said hitch receiver, and also includes a post member being attached to said elongate hitch member and extending upwardly therefrom, and further includes a planar mounting bracket being attached to a top end of said post member and having holes disposed therethrough and being fastenable with fasteners near said back end of said main channel member.

8. A motorcycle loading and support assembly for a truck as described in claim 7, wherein said winch assembly includes a mounting bracket being adapted to be securely attached to the truck box, and also includes a motor being securely mounted upon, said mounting bracket and having a power cord which is adapted to be connected to a power source of the truck, and further includes a reel being rotatably mounted to said motor, and also includes a cable being carried about said reel and being adapted to hook to the motorcycle for pulling the motorcycle upon said ramp assembly.

9. A motorcycle loading and support assembly for a truck as described in claim 8, wherein, said means of fueling a motorcycle includes a pump support stand being adapted to be disposed upon the truck box, and also includes fuel tank members being adapted to be disposed upon the truck box, and further includes a pump being mounted upon said pump support stand and including a lever for pumping fuel from said fuel tank members and also including a hose for dispensing fuel to the motorcycle, and also includes a conduit interconnecting said fuel tank members to said pump and upon which said end portion of said main channel member is disposed.

10. A motorcycle loading and support assembly for a truck as described in claim 9, wherein said tie-downs are generally eyelets being attached to said fuel tank members and to said pump support stand.

* * * * *